Patented May 29, 1951

2,555,212

UNITED STATES PATENT OFFICE 2,555,212

METHOD OF MAKING LACTOSE

Alexander E. Wallace, Columbus, Ohio, assignor to M & R Dietetic Laboratories, Inc., a corporation of Ohio No Drawing. Application June 20, 1947, Serial No. 756,108

9 Claims. (Cl. 127—31)

This invention relates to the recovery of lactose from lactose-bearing liquids and has reference more particularly to a process for the recovery of lactose in crystalline form of high purity from lactose-bearing liquids containing proteinaceous compounds, salts, inorganic cations and anions, and other inorganic and organic substances and possessing relatively high degrees of acidity, such as acid wheys.

As is known, wheys are particularly variable with respect to their content of mineral substances and especially with respect to their content of calcium, phosphorus, and ionic chlorine. Whey, obtained as the result of the manufacture of casein from skim milk or in the manufacture of cottage cheese, contains considerably greater proportions of calcium and phosphorus than does sweet whey obtained in the manufacture of cheeses of the cheddar and the Swiss types, for example. Use of hydrochloric acid in the manufacture of casein and calcium chloride, as is sometimes done in the manufacture of cottage cheese, increases the chloride content of the whey over and above the amounts found in normal milk. In a similar manner, the sulfate content of whey is substantially increased when sulfuric acid is used in the manufacture of casein.

Wheys are also widely variable with respect to acidity (pH). Wheys obtained from the manufacture of cheeses, such as cheddar and Swiss types, usually possess a pH above about 5.8, whereas wheys obtained from the manufacture of casein and certain other types of cheeses, such as cottage cheese, possess a pH usually between about 4.0 and 4.8. In one of the processes of manufacturing casein from skim milk the pH is adjusted so that it falls near the isoelectric point of casein, usually in a range from about 4.2 to 4.8, by the addition of a mineral acid such as hydrochloric acid or sulfuric acid. The acidulated milk is warmed to temperatures in a range from about 90° to 120° F. in order to produce complete coagulation of the casein which is then removed from suspension leaving an acidulated whey. Casein is sometimes made by what is known as the "natural sour" process in which the desired acidity is developed by bacterial fermentation of the lactose present in the milk. Whey of relatively high acidity is also obtained in the manufacture of cottage cheese and cheeses of similar characteristics. In their manufacture acidity is developed by bacterial fermentation of lactose. Wheys obtained from milk and milk products in which bacterial fermentation of lactose has taken place have a materially reduced content of lactose.

Acid wheys are examples of lactose-bearing liquids to which the process of my invention may be applied. By acid wheys I mean those wheys obtained from milk, or milk products, having a pH no higher than about 5.7 and usually in a range of about 4.0 to 5.4. Examples are those wheys obtained in the manufacture of casein and in the manufacture of cottage cheese. Many of the acid wheys have a pH in the approximate range of 4.0 to 4.7, and these wheys may be used as starting materials in accordance with the present invention. Those of higher pH must first be adjusted by the addition of an acid, such as sulfuric acid, acetic acid and the like, and preferably hydrochloric acid, so that the pH of the liquids falls within the range. In general, buttermilk and other cultured milks having a pH not greater than 5.7 are starting materials to which my process may be applied. In the conventional process as generally practiced in the art of recovering lactose from acid wheys, the whey proteins and a portion of the whey minerals are precipitated by heating after adding sufficient lime to adjust the pH of their solution to about 6.2 to 6.4, the coagulated and precipitated materials are separated from the liquid, usually by filtration, the filtered liquid is partially condensed during which step in the process additional precipitation of proteinaceous substances and mineral substances occurs, the partially condensed liquid is subjected to filtration, the filtered liquid is condensed further to some definite concentration of total solids, the condensed liquid is subjected to controlled cooling so as to crystallize the lactose, the massecuite is centrifuged to separate the lactose crystals from the mother liquor, the lactose crystals are washed with water to free them of residual mother liquor and a goodly portion of the water-soluble substances, the crystals are re-dissolved in water, the water solution of lactose is subjected to the action of purifying carbon and other chemicals and is filtered, the filtered solution is re-condensed to some definite concentration of solids, and the lactose is recrystallized, centrifuged, washed with water, and dried. The crystalline lactose produced by this process is of high purity and usually meets the U. S. P. standards.

The lactose obtained on the first crystallization by the conventional method is usually contaminated with considerable quantities of mineral substances having low solubility in water and usually does not conform to U. S. P. standards. The yield of refined lactose meeting the U. S. P. standards as made by the conventional process usually is about 50% to 60% of the amount of lactose originally present in the starting material.

The process of the present invention requires fewer processing steps to recover crystalline lactose of high purity from lactose-bearing liquids than does the conventional process used in the art of making lactose. Separation of coagulated proteins and other precipitated substances from the liquid, condensing of the lactose solution to its final concentration, and crystallization of the lactose and washing of the lactose crystals are each accomplished in single steps whereas multiple steps are required for each in the conventional process. Resolution of the once crystallized lactose and treatment of the resulting solution with purifying carbon and other chemicals are unessential in the operation of my process. I have been consistently able, in the operation of my process, to effect yields of crystallized lactose of high purity of about 75% to 85%, or even greater, of the amount of lactose originally present in lactose-bearing liquids such as acid whey. The savings in time and labor, the reduction in cost per pound of final product, and the materially increased yields of a valuable food substance are economically important.

The process of my invention essentially consists of the sequential steps of heating the lactose-bearing liquid having a pH in the range from about 4.0 to 4.7 to coagulate the proteins that are present, separating the coagulum from the liquid by some suitable means, contacting the clarified liquid with a suitable cationic exchanger material to remove from the liquid most of the calcium and magnesium ions contained therein, condensing the liquid after treatment with cationic exchanger material to some definite concentration of solids, crystallizing the lactose present in the condensed liquid, centrifuging the resulting massecuite to separate the lactose crystals from the mother liquor, washing the lactose crystals with water to remove therefrom most of the contaminating substances, and drying the resulting crystalline lactose. The processing step comprising the coagulation of proteins logically precedes the cationic exchanger step in the process of recovery of lactose from said wheys since the pH of the starting material generally is in a range favorable to protein coagulation.

In the step of the process comprising the contacting of a lactose-bearing liquid with cationic exchanger material salts of low water-solubility present in the liquid are converted to salts possessing high solubility in water. This is accomplished primarily by removing polyvalent cations from the liquid and exchanging therefor monovalent cations. Lactose-bearing liquids, such as wheys derived from milk and milk products, contain calcium phosphate and calcium citrate; minor quantities of magnesium phosphate and magnesium citrate are also present. These salts are soluble at the concentrations in which they usually occur in wheys but are precipitated and become insoluble when their solutions are concentrated as is done in the condensing step in the process of manufacturing lactose. If not removed from the lactose-bearing liquid previous to the crystallizing step they interfere with lactose crystallization, contaminate the crystallized lactose, and, because of their low solubility in water, are not easily washed from the crystallized lactose without redissolving inordinate amounts of the lactose.

An important step in my process consists in contacting the lactose-bearing liquid with active cationic exchanger material thereby removing from the liquid most of the calcium and magnesium and exchanging therefor monovalent cations which thereupon form new salts, or acids, with anions, especially phosphate and citrate ions, remaining in the liquid. These newly formed phosphate and citrate salts are highly soluble in water in contradistinction to the phosphates and citrates of polyvalent cations, especially calcium and magnesium, and remain in solution during the condensing step in the process of making lactose. Even though the newly formed salts may contaminate the crystals of lactose upon separation from the mother liquor, they are easily washed therefrom without inordinate re-solution of the lactose, because of their high solubility in water.

In the contacting of lactose-bearing liquids, such as acid whey, with cationic exchanger material acting in the alkali metal cycle, calcium and magnesium ions are removed from the liquid and alkali metal ions pass from the exchanger material into the liquid. This action converts the phosphates and citrates of calcium and magnesium, having low solubility in water, into alkali metal phosphates and citrates, having high solubility in water.

Potassium is also a normal constituent of lactose-bearing liquids. When whey is passed through a bed of cationic exchanger material acting in the sodium cycle, for instance, a considerable quantity of potassium ions are taken up by the exchanger material from the first fraction of the whey through the bed. As the flow of whey through the bed continues the exchanger material becomes saturated with respect to potassium ions but still has power to take up calcium and magnesium ions for which the exchanger material has greater affinity. The exchanger material has now in effect become a potassium exchanger and gives up its potassium in exchange for calcium and magnesium ions. The net effect, therefore, is as though the exchanger material continued to act in the sodium cycle with respect to its absorption of calcium and magnesium ions. This mechanism makes it possible for me to treat a greater volume of whey with a given volume of exchanger material before regeneration of the exchanger material becomes necessary than otherwise would be possible. An additional effect of replacing calcium and magnesium ions in the liquid with alkali metal ions is an increase in pH due to the greater alkali effect of the alkali metal.

When whey is passed through a bed of cationic exchanger material acting in the hydrogen cycle the net effect is similar in that calcium and magnesium ions are taken up from the liquid but hydrogen ions pass into the liquid converting the anions, originally forming salts with calcium and magnesium, to acids thereby lowering the pH of the liquid. Although potassium and sodium ions are also taken up by the exchanger material from the first fraction of the whey through the bed a goodly portion of these ions return to the liquid in exchange for calcium and magnesium ions as the full volume of whey is passed through the bed of exchanger material.

When whey is passed through cationic exchanger material acting in the mixed alkali metal-hydrogen cycle the net effect is that calcium and magnesium ions are removed from the liquid and the anions remaining in the liquid are converted to a mixture of acids and alkali metal salts of these acids.

In carrying out the cationic exchange step of my invention I prefer to have the cationic exchanger material acting in the alkali metal cycle. The cationic exchanger material may be activated by regenerating with a suitable alkali metal salt in aqueous solution. I prefer to use sodium chloride for this purpose although other alkali metal salts, such as sodium sulfate, sodium acetate, potassium chloride, potassium sulfate, potassium acetate, and the like may be used.

In a typical operation about 1110 pounds of whey obtained from the manufacture of casein by the hydrochloric acid process were heated to 205° F. and held at that temperature for 15 minutes in order to coagulate the whey proteins. The coagulum was allowed to settle for a period of 30 minutes after which the supernatant liquid was decanted rapidly and filtered. The rest of the whey containing the coagulum was also filtered and added to the clear supernatant liquid. The pH of the original whey was 4.30 and after filtration it was 4.37.

The filtered whey was cooled to about 120° F. and 1041 pounds of it were percolated through a bed of resinous cationic exchanger material acting in the sodium cycle. The volume of exchanger material was 17.5 liquid gallons and was contained in a vertical cylinder of 15 inches internal diameter. Previous to the treatment of whey the exchanger material was regenerated to the sodium cycle with 90 gallons of regenerating solution containing 1,000 milliequivalents of sodium chloride and 15 milliequivalents of sodium hydroxide per liter. The mixed whey from the exchanger unit had a pH of 5.42. Analysis showed that 96.0% of the calcium originally present in the whey was removed by this step.

The pH of the mixed whey was raised from 5.42 to 6.50 by the addition of a requisite quantity of sodium hydroxide solution. The whey was then condensed to a concentration of about 68% solids. The condensed whey was subjected to controlled cooling and stirring for a period of about 17 hours in order to crystallize the lactose to proper grain size. The lactose crystals were separated from the mother liquor in a perforated basket centrifuge and the crystals were washed with water to remove the residual mother liquor and other soluble substances. An additional crop of lactose crystals was recovered from the wash water.

There was recovered in the form of dry crystals 90.5% of the lactose present in the massecuite. I have found that there is a loss of about 10% of the lactose present in the original whey because of various processing losses. Allowing 10% for these losses the yield was 81.4% of the lactose present in the original whey. The dry lactose contained 0.085% ash and 0.018% nitrogen.

While I prefer to use cationic exchanger material acting in the alkali metal cycle in the operation of my process I have found that cationic exchanger material acting in the mixed alkali metal-hydrogen cycle can be used. The cationic exchanger material may be thus activated by regenerating with a suitable mixture of an alkali metal salt and an acid in aqueous solution. I prefer to use sodium chloride and hydrochloric acid for this purpose although other alkali metal salts, such as sodium sulfate, sodium acetate, potassium chloride, potassium sulfate, and the like, and other acids, such as sulfuric acid, acetic acid, and the like may be used.

In a typical operation 4670 pounds of whey, obtained from the manufacture of cottage cheese, were heated to 180° F. via plate type heat exchanger and further heated in a processing vat to about 205° F. by direct steam injection. The temperature was held for 15 minutes during which time coagulation of the whey proteins occurred. The pH of the original whey was 4.40 which was considered sufficiently near the isoelectric point of whey proteins to not require further adjustment. After allowing the coagulum to settle the supernatant liquid was drawn off and filtered to remove from suspension a small quantity of coagulated material. The fraction of the whey containing the main portion of coagulum was discarded. The pH of the filtered whey was 4.47.

The filtered whey (only 2400 pounds were used), after cooling to 100° F., was percolated through a bed of carbonaceous cationic exchanger material acting in the mixed sodium-hydrogen cycle. The volume of exchanger material was 40 gallons and was contained in a vertical cylinder of 17.5 inches internal diameter and 233 square inches internal cross section. Previous to the treatment of the whey the exchanger material was regenerated with 240 gallons of an aqueous solution containing 1000 milliequivalents of sodium chloride and 25 milliequivalents of hydrochloric acid per liter and thereafter was washed with water to remove excess regenerating solution. The whey was passed through the bed of exchanger material at the constant flow rate of 7 gallons per minute.

The pH of the influent whey was 4.47 and that of the mixed whey after contact with the exchanger material was 4.31. According to analyses, the original whey contained 0.650% ash, 0.118% calcium, 0.080% phosphorus, 0.095% chloride, and 0.127% nitrogen whereas the whey following treatment with the cationic exchanger material, after correction for dilution due to residual water in the bed of exchanger material, contained 0.690% ash, 0.009% calcium, 0.073% phosphorus, 0.094% chloride, and 0.051% nitrogen. Approximately 60% of the total nitrogen and 92.5% of the calcium originally present in the whey were removed in the steps of the process.

The pH of the treated whey from the exchanger step was adjusted to 6.40 by the addition of a solution of sodium hydroxide and the liquid was condensed under partial vacuum at approximately 140° F. to a concentration of about 60% total solids. The condensed liquid was subjected to controlled cooling and stirring to crystallize the lactose contained therein. The resulting massecuite was centrifuged in a conventional perforated basket to separate the crystals from the mother liquor. The crystallized lactose, while held in the rotating centrifuge, was washed with water to essentially free it of residual mother liquor, salts and other substances. The wash water, containing dissolved lactose, salts, nitrogenous substances, etc., was recovered and subsequently condensed to a concentration of about 60% solids. The lactose in the condensed liquid was crystallized, centrifuged, and washed in the usual manner to obtain an additional crop of crystals.

A total yield of 87.8 pounds of dry lactose were recovered from the whey. There were 98.1 pounds of lactose in the 2400 pounds of whey that were treated in the cationic exchange step. The dry lactose contained 0.007% nitrogen and 0.151% ash.

It will be understood that in practical day-to-day operation of my invention the fraction of the lactose-bearing liquid containing the settled coagulum would not be discarded as was done in the example given but, instead, would be subjected to separation by some suitable means to remove the coagulum from the liquid so as to recover substantially all of the liquid which contains valuable lactose. Had this been done the yield of lactose would have been substantially greater than the 87.8 pounds indicated.

An alternate procedure may be used for recovering lactose from the water used in washing the lactose crystals. Instead of condensing the wash water and crystallizing the lactose contained therein, the wash water may be added to a subsequent batch of whey just ahead of the cationic exchange step and thereby subjected sequentially to the steps of my process beginning with the cationic exchange step.

In the operation of my invention I have found that about 40% of the lactose present in the mother liquor may be recovered by contacting it with cationic exchanger material, condensing the resulting treated liquid to some definite concentration of solids, subjecting the condensed liquid to the crystallization step, centrifuging the resulting massecuite in a perforated basket, and washing the lactose crystals obtained thereby to remove substantially all of the contaminating substances. The overall yield of lactose is increased by about 5 to 10% by employing this step in my process. This step may be carried out in a practical operation either by accumulating the mother liquor from several batches of whey and passing it sequentially through the steps of the process beginning with the cationic exchange step or by adding the mother liquor to a subsequent batch of whey to be processed.

Cationic exchanger materials acting solely in the hydrogen cycle may be used in the operation of my invention. I have found that cationic exchanger materials acting in the hydrogen cycle remove polyvalent cations, such as calcium and magnesium, from lactose-bearing liquids, such as whey, more efficiently than do cationic exchanger materials acting solely in the alkali metal cycle or in the mixed alkali metal-hydrogen cycle thus making it possible to treat a greater volume of lactose-bearing liquid per given volume of exchanger material. The pH of the liquid, however, is thereby greatly decreased and since I desire to raise the pH of the liquid to about 6.2 to 6.4 for the next step in the process, namely, the condensing step, I consider the use of cationic exchanger materials acting solely in the hydrogen cycle in the cationic exchange step of my process to be not as desirable as the other cationic exchangers mentioned above.

It is well known that exposure of solutions of lactose to heat at relatively low pH, say below about 4.6, is conducive to degradation of lactose to the monosaccharides, glucose and galactose. Raising the pH into a range above 4.6, and preferably to about 6.0 to 6.6, tends to prevent further degradation of the lactose. I have found in the operation of my process that I can add enough alkali to the lactose-bearing liquid, after it has been subjected to protein coagulation and separation of the coagulum therefrom, to raise the pH to above 4.6 and preferably to about 6.0 to 6.6 and then proceed to the cationic exchange step. Although the amount of liquid that can be treated by a given volume of a cationic exchanger material, especially when it is acting in the alkali metal cycle, is somewhat decreased at the higher pH, neither the yield nor the purity of the crystalline lactose ultimately recovered from the liquid are adversely affected.

When the cationic exchanger material is to be regenerated to the alkali metal cycle, a solution containing between about 300 and 1,500, preferably about 1,000, milliequivalents of alkali metal salts per liter is used. Satisfactory regeneration is accomplished by using between about 3 and 15 gallons of regenerating solution per liquid gallon of exchanger material. In a pertinent example where a solution containing about 1,000 milliequivalents of sodium chloride per liter was used for the purposes of regenerating a bed of carbonaceous cationic exchanger material, and where such solution was percolated through the bed at room temperature at a flow rate in the vicinity of 5 gallons of the regenerating solution per liquid gallon of exchanger material per hour, about 6 gallons of regenerating solution per liquid gallon of exchanger material were required for satisfactory regeneration.

When the cationic exchanger material is to be regenerated to the hydrogen cycle, a solution containing between about 100 and 600, preferably about 400 milliequivalents of acid per liter is used. Satisfactory regeneration is accomplished by using between about 3 and 15 gallons of regenerating solution per liquid gallon of exchanger material. In a pertinent example where a solution containing about 400 milliequivalents of hydrochloric acid per liter was used for the purpose of regenerating a bed of carbonaceous cationic exchanger material, and where such solution was percolated through the bed at a flow rate in the vicinity of 5 gallons of the regenerating solution per liquid gallon of exchanger material per hour, about 6 gallons of regenerating solution per liquid gallon of exchanger material were required for satisfactory regeneration.

When the cationic exchanger material is to be regenerated to the mixed alkali metal-hydrogen cycle, a solution containing between about 500 and 1,500, preferably about 1,000, milliequivalents of alkali metal salt and between about 5 and 50, preferably about 10, milliequivalents of acid per liter is used. Lower proportions of alkali metal salt and higher proportions of acid may be employed but in such cases the pH of lactose-bearing liquids subsequently treated by exchanger materials thus regenerated is lowered. In the operation of my invention I desire to keep the pH as high as possible under the conditions involved so I prefer to use about 100 times as much alkali metal salt as acid, on a chemical equivalence basis, for regenerating the cationic exchanger material. Satisfactory regeneration is accomplished by using between about 3 and 15 gallons of regenerating solution per liquid gallon of exchanger material. In a pertinent example where a solution containing about 1,000 milliequivalents of sodium chloride and about 10 milliequivalents of hydrochloric acid per liter was used for the purpose of regenerating a bed of carbonaceous cationic exchanger material, and where such solution was percolated at room temperature through the bed at a flow rate in the vicinity of 5 gallons per liquid gallon of exchanger material per hour, about 6 gallons of the regenerating solution per liquid gallon of exchanger material were required for satisfactory regeneration.

In operating the cationic exchanger step of my process I prefer to use a flow rate of about 10 gallons per liquid gallon of exchanger material per hour when treating lactose-bearing liquids, such as whey. I have found that when the flow rate is substantially increased the exchanger material becomes less efficient in removing cations from the liquid being treated; consequently too large an amount of the polyvalent cations, particularly calcium and magnesium ions, remains in the treated liquid and adversely affects the purity of the crystalline lactose ultimately recovered from this liquid. On the other hand, when the flow rate is materially decreased the efficiency of cation removal is not increased sufficiently to justify the longer time thereby required for treating the lactose-bearing liquid. It should be understood, however, that flow rates other than the preferred rate may be used in carrying out the cationic exchange step of this process.

I have found that there is a variable relationship between the volume of cationic exchanger material and the volume of lactose-bearing liquid that can be passed through the bed before the exchanger material becomes too spent to remove cations, especially calcium and magnesium ions, to the extent desired for the purposes of my invention. In general, 6 to 10 gallons of acid whey, containing about 0.100 to 0.130% calcium, per liquid gallon of exchanger material can be treated to remove calcium and magnesium ions therefrom to the extent necessary for ultimately recovering crystalline lactose of high purity. The volume of lactose-bearing liquid that can be treated by a given volume of exchanger material decreases with increases in concentration of calcium and magnesium in the liquid being treated. Cationic exchanger materials that have been regenerated to their maximum activity treat more lactose-bearing liquid than those regenerated to less than their fullest activity. Another factor that affects the amount of lactose-bearing liquid that can be treated is the type of cationic exchanger material employed.

When a lactose-bearing liquid, such as whey, is passed through cationic exchanger material acting solely in the hydrogen cycle, in the mixed alkali metal-hydrogen cycle, or solely in the alkali metal cycle only traces of calcium appear in the first fraction of the effluent but subsequently the calcium concentration in the effluent rises slowly as the volume of liquid passed through the exchanger material increases. When the instantaneous concentration of calcium in the effluent increases to about 2 to 5, preferably 3, milliequivalents per liter the flow of lactose-bearing liquid is stopped and the exchanger material is regenerated before proceeding to the processing of the next batch of lactose-bearing liquid. If a substantially greater volume of lactose-bearing liquid is passed through the bed of exchanger material the concentration of calcium and magnesium in the effluent becomes too great and the purity of the crystalline lactose ultimately recovered from the liquid is adversely affected. It is to be understood that when crystalline lactose of lesser purity is desired the volume of lactose-bearing liquid treated in the cationic exchange step of my process may be substantially increased and, at the point at which treatment is stopped, the instantaneous concentration of calcium in the effluent may be substantially greater than 5 milliequivalents per liter.

Before proceeding to the condensing step of my process I have found it advantageous to adjust the pH of the lactose-bearing liquid upward to within a range of about 5.8 to 6.6, preferably about 6.2 to 6.4, using an alkali metal hydroxide, such as sodium hydroxide and potassium hydroxide, for this purpose. When heating of the liquid, having a pH lower than about 5.7, takes place during the condensing step a brownish colored substance of unknown composition is formed, especially if the heating is excessive with respect to time and/or temperature. This insoluble substance is most difficult to remove from the subsequently crystallized lactose and consequently adversely affects the purity and color of the lactose. I have found that when the pH of the liquid is adjusted to within the specified range previous to condensing the amount of brownish colored substance formed is inconsequential, or even nil.

I prefer to condense the lactose-bearing liquid to a total solids concentration in the vicinity of 70%, or to that concentration at which proper "graining" of the lactose is observed, in order to minimize lactose losses in the mother liquor. The small quantity of salts of low solubility in water remaining in the lactose-bearing liquid after proper treatment with cationic exchanger material permits concentration of the liquid to a higher degree than otherwise would be possible.

In the operation of my invention I have found that the separation of the protein coagulum from the lactose-bearing liquid may be accomplished by filtration, sedimentation, decantation, siphonation, centrifugation in an imperforate bowl, or by various combinations of the foregoing methods.

While this invention relates essentially to the use of acid wheys having a pH within the approximate range of 4.0 to 4.7 as a starting material, it is to be understood that the process may be applied to other acid wheys having a pH up to about 5.7 and even to lactose-bearing liquids possessing a pH higher than 5.7 provided that first the pH of the liquid is lowered to about 4.0 to 4.7, by the addition of acid. I prefer to use hydrochloric acid for this purpose but other acids, such as sulfuric acid, acetic acid and the like, may be used.

The use of specific types of cationic exchanger materials in the examples presented herein does not constitute a preference for these types. Cationic exchanger materials of the carbonaceous and resinous types and other cationic exchanger materials that produce similar results may be used in the operation of my invention.

I claim:

1. In the method of recovering lactose in a crystalline form of high purity from an acid whey having a pH within the approximate range of 4.0 to 4.7, comprising heating such whey to coagulate proteins therein and separating the coagulated proteins from the whey liquid, contacting the whey liquid with a cationic exchanger material having replaceable monovalent cations therein of the class consisting of alkali metals, hydrogen and mixtures thereof, to effect replacement of calcium and magnesium ions in said liquid with such cations in said exchanger material, thereby changing those salts in the whey liquid characterized by low solubility in water to salts and/or acids having high solubility in water, and condensing the exchanger-treated liquid until graining suitable for lactose crystallization is obtained in the presence of said compounds of high water solubility.

2. In the method of recovering lactose in a crystalline form of high purity from an acid whey having a pH within the approximate range of 4.0 to 4.7, comprising heating such whey to coagulate proteins therein and separating the coagulated proteins from the whey liquid, adjusting the pH of the whey liquid upward with an alkali so that it falls within the approximate range of 6.0 to 6.6, contacting the pH-adjusted whey liquid with a cationic exchanger material having replaceable monovalent cations therein of the class consisting of alkali metals, hydrogen and mixtures thereof, to effect replacement of calcium and magnesium ions in said liquid with such cations in said exchanger material, thereby changing those salts in the whey liquid characterized by low solubility in water to salts and/or acids having high solubility in water, and condensing the exchanger-treated liquid until graining suitable for lactose crystallization is obtained in the presence of the said compounds of high water solubility.

3. In the method of recovering lactose in a crystalline form of high purity from an acid whey having a pH within the approximate range of 4.0 to 4.7, comprising heating such whey to coagulate proteins therein and separating the coagulated proteins from the whey liquid, contacting the whey liquid with a cationic exchanger material having replaceable monovalent cations therein of the class consisting of alkali metals, hydrogen and mixtures thereof, to effect replacement of calcium and magnesium ions in said liquid with such cations in said exchanger material, thereby changing those salts in the whey liquid characterized by low solubility in water to salts and/or acids having high solubility in water, adding an alkali metal hydroxide to the exchanger-treated whey liquid to adjust the pH thereof upward to fall within the approximate range of 5.8 to 6.6, and condensing the resulting liquid until graining suitable for lactose crystallization is obtained in the presence of the said compounds of high water solubility.

4. In the method of recovering lactose in a crystalline form of high purity from an acid whey having a pH within the approximate range of 4.0 to 4.7, comprising heating such whey to coagulate proteins therein and separating the coagulated proteins from the whey liquid, adjusting the pH of the whey liquid upward with an alkali so that it falls within the approximate range of 6.0 to 6.6, contacting the pH-adjusted whey liquid with a cationic exchanger material having replaceable monovalent cations therein of the class consisting of alkali metals, hydrogen and mixtures thereof, to effect replacement of calcium and magnesium ions in said liquid with such cations in said exchanger material, thereby changing those salts in the whey liquid characterized by low solubility in water to salts and/or acids having high solubility in water, adding an alkali metal hydroxide to the exchanger-treated whey liquid to adjust the pH thereof upward to fall within the approximate range of 5.8 to 6.6, and condensing the resulting liquid until graining suitable for lactose crystallization is obtained in the presence of the said compounds of high water solubility.

5. In the method of recovering lactose in a crystalline form of high purity from an acid whey having a pH within the approximate range of 4.0 to 4.7, comprising heating such whey to coagulate proteins therein and separating the coagulated proteins from the whey liquid, contacting the whey liquid with a cationic exchanger material acting in the alkali metal cycle, to effect replacement of calcium and magnesium ions in said liquid with cations in said exchanger material, thereby changing those salts in the whey liquid characterized by low solubility in water to salts having high solubility in water, and at the same time raising the pH of the liquid, and condensing the exchanger-treated liquid until graining suitable for lactose crystallization is obtained in the presence of the said salts of high water solubility.

6. In the method of recovering lactose in a crystalline form of high purity from an acid whey having a pH within the approximate range of 4.0 to 4.7, comprising heating such whey to coagulate proteins therein and separating the coagulated proteins from the whey liquid, contacting the whey liquid with a cationic exchanger material acting in the alkali metal cycle, to effect replacement of calcium and magnesium ions in said liquid with cations in said exchanger material, thereby changing those salts in the whey liquid characterized by low solubility in water to salts having high solubility in water, and at the same time raising the pH of the liquid, adding an alkali metal hydroxide to the exchanger-treated whey liquid to adjust the pH thereof upward to fall within the approximate range of 5.8 to 6.6, and condensing the resulting liquid until graining suitable for lactose crystallization is obtained in the presence of the said salts of high water solubility.

7. In the method of recovering lactose in a crystalline form of high purity from a lactose-bearing liquid having a pH within the approximate range of 4.0 to 4.7, comprising heating such liquid to coagulate proteins therein and separating the coagulated proteins from the liquid, contacting the protein-free liquid with a cationic exchanger material having replaceable monovalent cations therein of the class consisting of alkali metals, hydrogen and mixtures thereof, to effect replacement of calcium and magnesium ions in said liquid with such cations in said exchanger material, thereby changing those salts in the whey liquid characterized by low solubility in water to salts and/or acids having high solubility in water, and condensing the exchanger-treated liquid until graining suitable for lactose crystallization is obtained in the presence of the said compounds of high water solubility.

8. In the method of recovering lactose in a crystalline form of high purity from a lactose-bearing liquid having a pH within the approximate range of 4.0 to 4.7, comprising heating such liquid to coagulate proteins therein and separating the coagulated proteins from the liquid, contacting the protein-free liquid with a cationic exchanger material having replaceable monovalent cations therein of the class consisting of alkali metals, hydrogen and mixtures thereof, to effect replacement of calcium and magnesium ions in said liquid with such cations in said exchanger material, thereby changing those salts in the lactose-bearing liquid characterized by low solubility in water to salts and/or acids having high solubility in water, adding an alkali metal hydroxide to the exchanger-treated lactose-bearing liquid to adjust the pH thereof upward to fall within the approximate range of 5.8 to 6.6, and condensing the resulting liquid until graining suitable for lactose crystallization is obtained in the presence of the said compounds of high water solubility.

9. In the method of recovering lactose in a crystalline form of high purity from a lactose-bearing liquid having a pH within the approximate range of 4.0 to 4.7, comprising heating such liquid to coagulate proteins therein and separating the coagulated proteins from the liquid, contacting the protein-free liquid with a cationic exchanger material having replaceable monovalent cations therein to effect replacement of calcium and magnesium ions in said liquid with cations in said exchanger material, thereby changing those salts in the lactose-bearing liquid characterized by low solubility in water to salts and/or acids having high solubility in water, adding an alkali metal hydroxide to the exchanger-treated lactose-bearing liquid to adjust the pH thereof upward to fall within the approximate range of 5.8 to 6.6, and condensing the resulting liquid until graining suitable for lactose crystallization is obtained in the presence of the said compounds of high water solubility.

ALEXANDER E. WALLACE.

REFERENCES CITED

The following references are of record in the file of this patent:

UNITED STATES PATENTS

| Number | Name | Date |
| --- | --- | --- |
| 758,065 | Hall | Apr. 26, 1904 |
| 2,145,109 | Delisle | Jan. 24, 1939 |
| 2,155,318 | Liebknecht | Apr. 18, 1939 |
| 2,319,649 | Walsh | May 18, 1943 |
| 2,365,221 | Shafor | Dec. 19, 1944 |
| 2,477,558 | Almy et al. | Aug. 2, 1949 |

FOREIGN PATENTS

| Number | Country | Date |
| --- | --- | --- |
| 116,691 | Australia | Mar. 9, 1943 |
| 542,846 | Great Britain | Jan. 29, 1942 |

OTHER REFERENCES

Myers et al., Ind. and Eng. Chem., vol. 33, No. 6, June 1941, pages 697–706 (pages 705 and 706 pertinent).

Chem. Soc. Jour., New Series, vol. 48, 1885, page 848.